United States Patent
Sellers

(10) Patent No.: US 7,086,654 B2
(45) Date of Patent: Aug. 8, 2006

(54) SNOW-BRAKE FOR SLED

(76) Inventor: David Sellers, 2 Brook Rd., Warren, VT (US) 05764

( * ) Notice: Subject to any disclaimer, the term of this patent is extended or adjusted under 35 U.S.C. 154(b) by 0 days.

(21) Appl. No.: 10/329,284

(22) Filed: Dec. 24, 2002

(65) Prior Publication Data

US 2004/0119253 A1    Jun. 24, 2004

(51) Int. Cl.
*B62B 13/00*    (2006.01)
(52) U.S. Cl. .................................. 280/18; 280/21.1
(58) Field of Classification Search .................. 280/18, 280/14.2, 18.1, 19, 21.1, 208, 14.1, 15, 19.1; D21/224
See application file for complete search history.

(56) References Cited

U.S. PATENT DOCUMENTS

| | | | | |
|---|---|---|---|---|
| 3,169,779 A | * | 2/1965 | Haab | 280/18 |
| 3,628,804 A | * | 12/1971 | Carreiro | 280/18 |
| 3,937,482 A | * | 2/1976 | Johnson | 280/18 |
| 4,320,905 A | * | 3/1982 | Andrew et al. | 280/18 |
| 4,561,664 A | * | 12/1985 | Cashmere | 280/18 |
| 4,666,171 A | | 5/1987 | Sellers | |
| 4,928,983 A | * | 5/1990 | Maass | 280/18 |
| 5,687,977 A | * | 11/1997 | Smith | 280/18 |
| 5,868,405 A | * | 2/1999 | Lavecchia et al. | 280/14.21 |
| 6,189,912 B1 | * | 2/2001 | Ritzinger | 280/609 |

* cited by examiner

*Primary Examiner*—Hau Phan
(74) *Attorney, Agent, or Firm*—Fish & Richardson P.C.

(57) ABSTRACT

A sled for sliding on a sliding surface has a hull with bow and stern ends, a side portion extending therebetween, and a bottom surface for contacting the sliding surface. A snow-brake integral with the hull is formed from a portion of the hull that extends outward from the hull and downward part-way to the bottom surface. The snow-brake forms a scoop for engaging the sliding surface when an angle between the hull and the sliding surface exceeds a critical angle. The critical angle is selected such that the bottom surface contacts the sliding surface while the snow-brake engages the sliding surface.

7 Claims, 9 Drawing Sheets

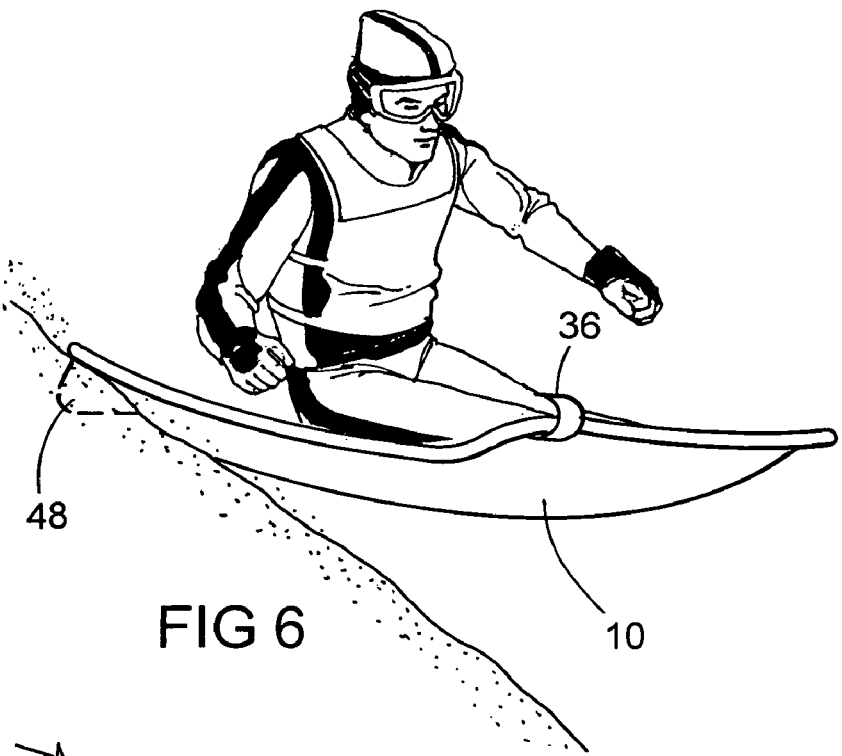
FIG 6
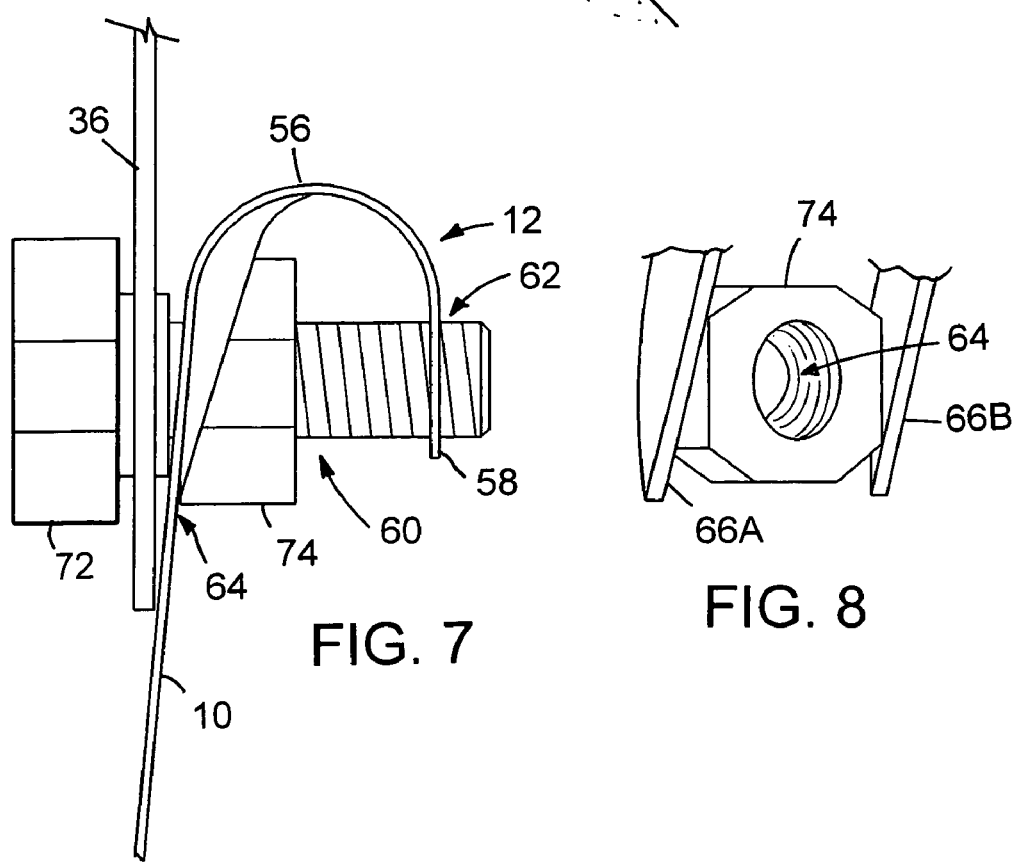
FIG. 7
FIG. 8

SNOW-BRAKE FOR SLED

FIELD OF INVENTION

The invention relates generally to sleds, and in particular, to braking a sled.

BACKGROUND

When riding a sled down a hill, it is often necessary to stop, sometimes rather quickly. One way to stop a sled is to lean backward, thereby increasing drag. However, this method is not particularly effective, particularly on ice or packed powder. Another method is to shift one's weight to quickly orient the sled so that it is perpendicular to the fall line. However, this method is difficult to execute.

In many cases, the only way to reliably stop the sled quickly is to jump off. At best, this is a somewhat ungraceful maneuver that is safe only at low speeds. Moreover, in a high-performance sled in which one is strapped into position, it is also impractical.

SUMMARY

In one aspect, the invention includes sled for sliding on a sliding surface. The sliding surface can be any surface, including snow, ice, sand, or even a synthetic surface. The sled has a hull with a bow end, a stern end, and a side portion extending between the bow end and the stern end, and a bottom surface for contacting the sliding surface. A snow-brake integral with the hull is formed from a portion of the hull that extends outward from the hull and downward part-way to the bottom surface. The snow-brake forms a scoop for engaging the sliding surface when an angle between the hull and the sliding surface exceeds a critical angle. The critical angle is selected such that the bottom surface contacts the sliding surface while the snow-brake engages the sliding surface.

In one embodiment, the portion of the hull includes a gunwale portion having a portion that extends downward part-way to the bottom surface. The snow-brake can be formed from the stern end of the hull, to brake forward motion, or from the side portion of the hull, to brake sideways motion.

In some embodiments, the snow-brake includes a gripping element mounted on a rim thereof. Suitable gripping elements can include, one or more teeth, claws, or studs. The gripping elements can be formed integrally with the snow-brake or they can be fastened to the snow-brake.

In another aspect, the invention includes a method of braking a sled moving on a sliding surface. As used herein, braking includes reducing the magnitude of the velocity vector and therefore includes slowing down the sled as well as bringing it to a halt.

The method includes providing a snow-brake extending outward from a portion of the hull of the sled and causing the portion of the hull to sink through the sliding surface to a depth sufficient to enable the snow-brake to engage the sliding surface. The extent of the braking action can be controlled by controlling the extent to which the portion of the hull sinks through the sliding surface.

These and other features and advantages of the invention will be apparent from the following detailed description and the figures, in which:

BRIEF DESCRIPTION OF THE DRAWINGS

FIG. 6 shows the snow-brake of FIGS. 4 and 5 in use;

FIGS. 7–9 show a configuration for attaching a strap to the hull;

DESCRIPTION OF THE PREFERRED EMBODIMENT

A downhill racing sled suitable for incorporating the features of the invention is described with particularity in Sellers, U.S. Pat. No. 4,666,171, the contents of which are herein incorporated by reference.

Figure 1:
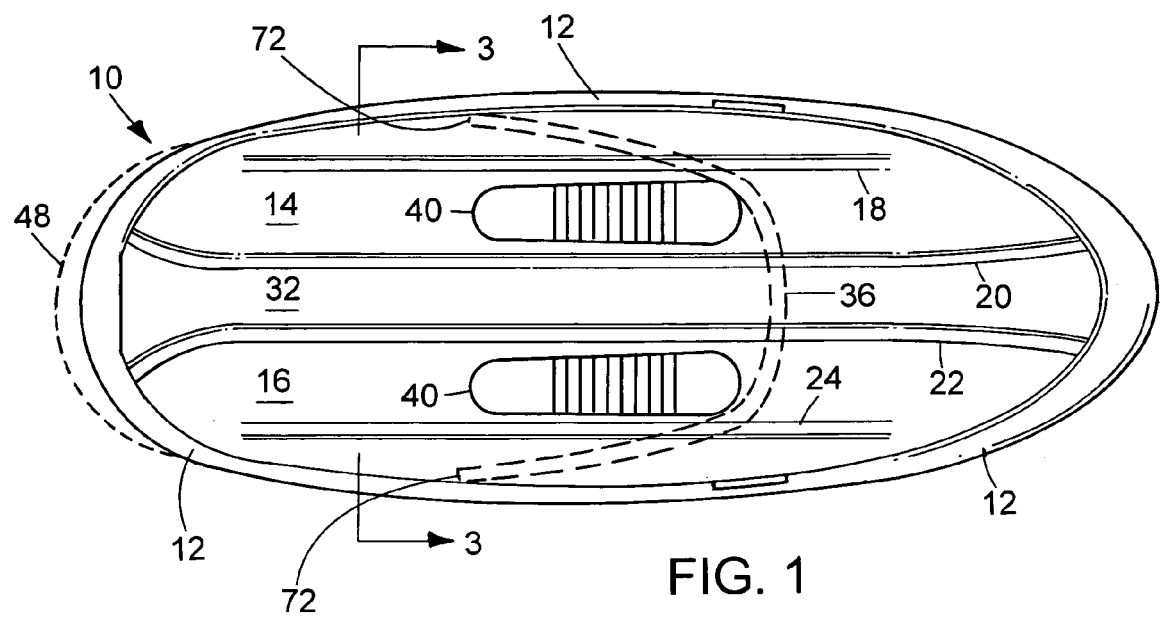
FIGS. 1 and 2 are top and side views of a hull for a sled.
Figure 2:
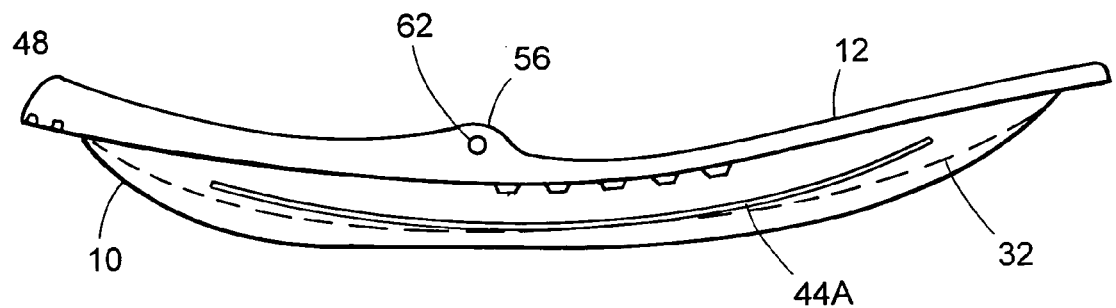
Figure 3:
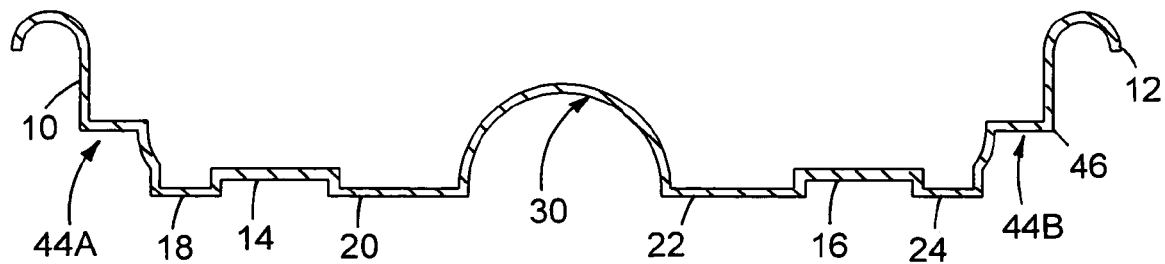
FIG. 3 is a cross-section of the hull shown in FIGS. 1 and 2.

As shown in FIGS. 1–3, the sled includes a one-piece elongated molded hull 10, preferably of vacuum-molded thermoplastic. The hull 10 has a bow or front-end, which is on the right as viewed in FIGS. 1 and 2, and a stern, or rear-end, which is on the left as viewed in FIGS. 1 and 2.

The hull 10 presents a generally crescent-shaped profile, best seen in FIG. 2. An upper outwardly rolled molded edge of the hull 10 forms continuous railings or gunwales 12 surrounding the hull 10. The gunwales 12 are raised at the bow to afford handholds and to protect against the intrusion of snow. The bottom of the hull 10 while generally curved in profile as shown in FIG. 2, includes certain features that enhance the sled's performance in deep snow.

In FIG. 3, a cross-section of the hull 10 reveals a pair of generally flat parallel runners 14, 16 defined by molded downwardly protruding parallel ribs 18, 20, 22, 24. Flat areas 26, 28 between the pairs of ribs act like wide skis to support the hull 10 as it moves through the snow. The ribs 18, 20, 22, 24 guide the hull 10 in a straight path and enhance tracking in packed snow.

In FIG. 3, a pair of steps formed on the sides of the hull 10 define a pair of generally flat steering runners 44A–B integral with the hull 10. The steering runners 44A–B define a downwardly extending arc, best seen in FIGS. 2 and 19, that is positioned high enough on the hull 10 so that when the hull 10 is level, the lowest points of both steering runners 44A–B are above the level of the snow. However, when the rider banks the hull 10 beyond a critical angle, a sharp edge 46 of one steering runner 44B contacts the snow. A downward component of the combined weight of the rider and sled is thus concentrated on the relatively small surface area of the edge 46. The extent of this downward component, and hence the pressure on the edge 46, depends on the extent to which the rider banks the hull 10, as well as on the slope of the prevailing terrain.

When the edge 46 contacts the snow, the force acting on the edge 46 generates drag. Since only one of the two steering runners 44A–B is in contact with the snow at any time, this drag tends to turn the hull 10. In this way, the steering runners 44A–B assist the rider in executing sharp turns.

The steering runners 44A–B are of particular use in icy or crusty conditions. Under these conditions, the pressure exerted by the edge 46 of a steering runner 44B enables it to bite into hard, icy surfaces. To further enhance this ability, a sharpened steel edge can be fastened onto the steering runner 44A–B.

Between the two runners 14 and 16, a main central channel 30 extends longitudinally from the bow to the stern of the hull 10, with progressively increasing depth as shown in FIGS. 2 and 3. The inside ribs 20 and 22 define the edges of the channel 30 and are slightly outwardly flared with gradually increasing spacing at both ends of the hull 10. Inside the hull 10, the molded channel 30 forms a large longitudinal central rib or keel-like hump 32 running down the center of the hull 10. Because of the increasing depth of the snow channel 30 toward the rear of the hull 10, the hump 32 becomes more pronounced toward the rear as shown in phantom in FIG. 2.

Figure 4:
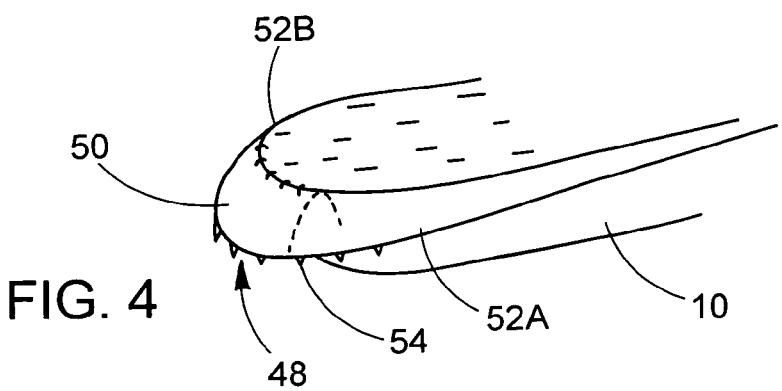
FIGS. 4–5 show a snow-brake mounted at the rear of the hull shown in FIGS. 1–3.
Figure 5:
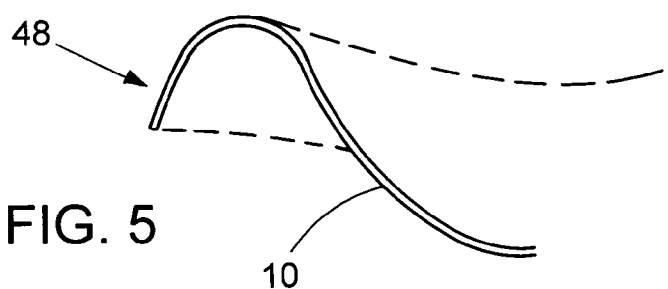

An outwardly molded stern portion of the hull 10 extends into a rear-facing lip 48, hereafter referred to as a "snow brake," that rolls downward, as shown in FIGS. 4 and 5. The snow-brake 48, which wraps around the stern portion of the hull 10, includes a rear portion 50 and two side portions 52A–B. The greatest extension of the snow-brake 48, both rearward and downward, is at its rear portion 50. The extent to which the snow-brake 48 projects outward and downward progressively decreases along the two side portions 52A–B until the snow-brake 48 merges smoothly with the gunwale 12.

To use the snow-brake 48, a rider leans back, as shown in FIG. 6. This causes the hull's bow to rise and its stern to sink. As the stern sinks, the rear portion 50 of the snow-brake 48 comes into contact with the snow and creates drag. The extent of this drag depends on the extent to which the stern sinks. This, in turn, is controlled by the extent to which the rider leans back.

By leaning backward and sideways at the same time, the rider can cause one side of the hull 10 to sink and the other to rise. As one side sinks, the side portion of the snow-brake 48 comes into contact with the snow and also creates drag. This drag, which only acts on one side of the hull 10, causes the hull 10 to turn swiftly in that direction. The snow-brake 48 can thus be used as a type of rudder as well as a brake.

Figure 17:
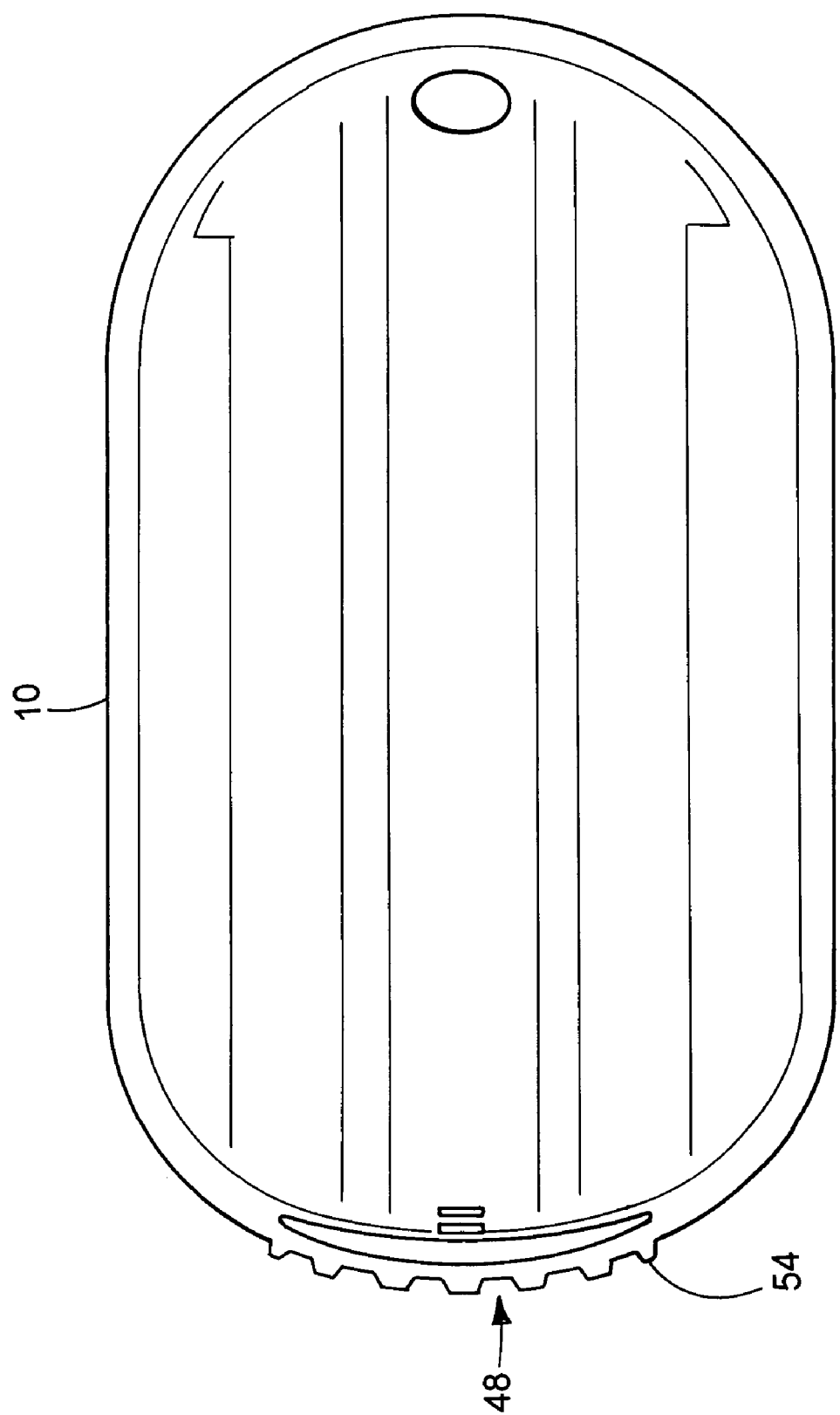
FIGS. 17–19 are views of an alternative hull.
Figure 18:
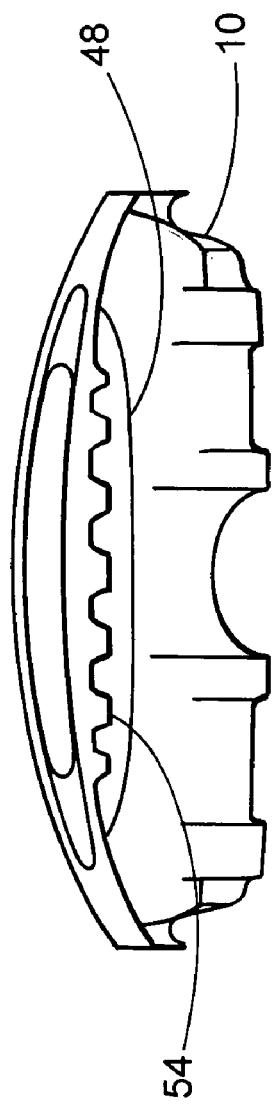
Figure 19:
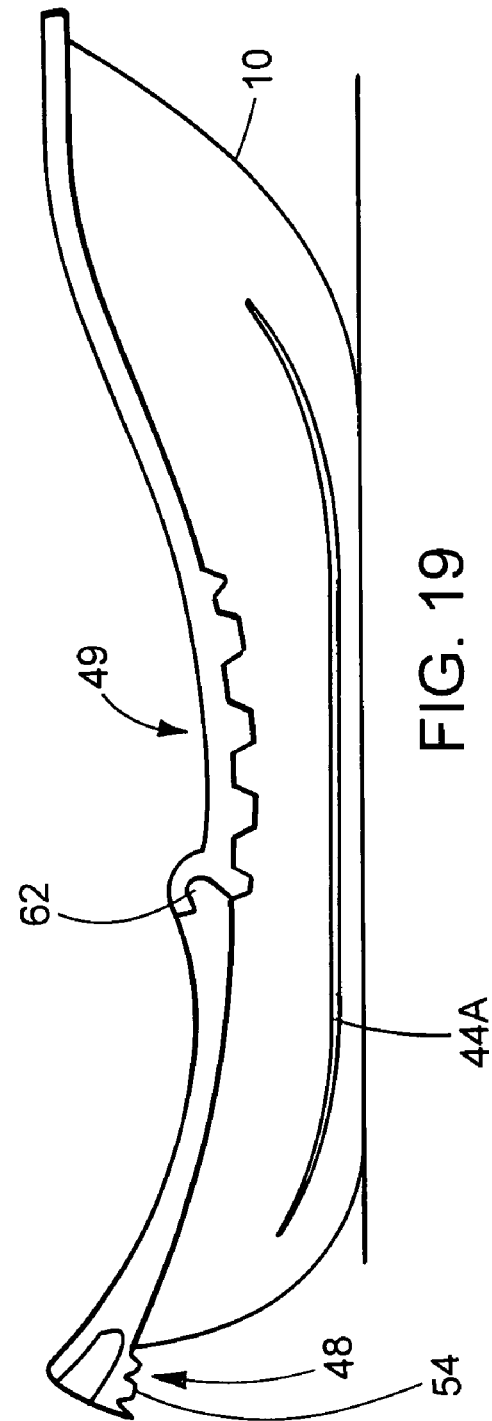

Optional gripping aids 54 can extend downward from the edges of the snow-brake to provide additional drag in icy conditions. These gripping aids can include teeth, as shown in FIGS. 17–19, studs, or claws, as shown in FIG. 4. The gripping aids 54 can be integral with the snow-brake 48 or formed on a metal plate which is then attached or fastened to the rim of the snow-brake 48.

A side-mounted snow-brake 49 can also be mounted on the gunwale 12 at the side of the hull 10 as shown in FIG. 19. Such a snow-brake 49 is formed by outwardly rolling the gunwale 12 so that it projects outward and downward part-way toward the snow.

The side-mounted snow-brake 49, steering rails 44A–B, and ribs 18, 24 collectively provide the rider with three progressively more effective ways to brake the sled when the sled is oriented in a direction having a component transverse to the fall line. The rider can lean sideways into a skid using the edges of the ribs 18, 24 for mild braking action, or the rider can lean further to engage the steering rails 44A–B for more effective braking. If necessary, the rider can lean far enough to engage the side-mounted snow-brake 49 and bring the sled to an abrupt stop.

Referring now to FIG. 7, side portions of the gunwale 12 are rolled outward to form a lip 56. This lip 56 curls downward to form a rim portion 58 parallel to the hull 10 and separated therefrom by a gap 60. An outboard hole 62 through the rim portion 58 is aligned with an inboard hole 64 through the hull 10. Molded retaining walls 66A–B, seem in isometric view in FIG. 8 flank the inboard hole 64 and extend outward from the hull 10, part way across the gap 60.

Figure 9:
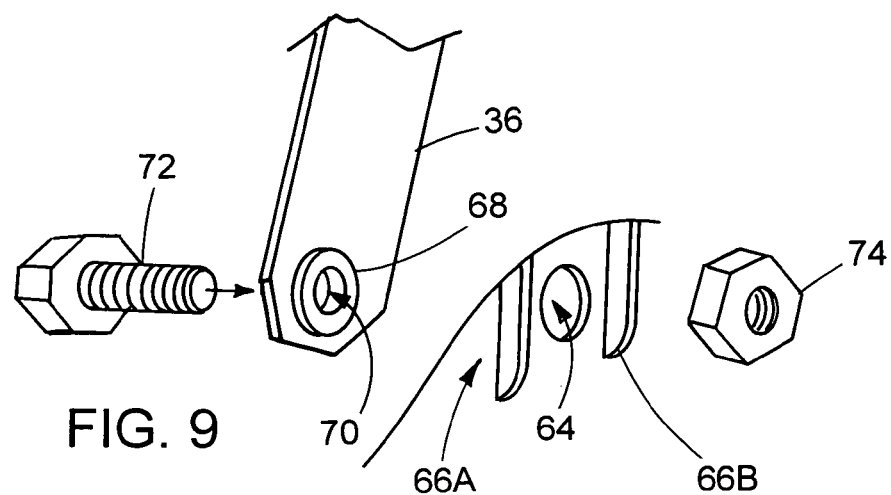

A knee strap 36 has a grommet 68 at each of its two ends, one of which is shown in FIG. 9. To attach the knee strap 36 to the hull 10, a grommet hole 70 defined by the grommet 60 is aligned with the inboard hole 64. Then, a threaded ½ inch bolt 72 is passed through the grommet hole 70 and through the inboard hole 64. The bolt 72 is long enough to extend through the inboard hole 64 and all the way to the outboard hole 62. Preferably, the bolt 72 extends approximately 3/16 inches beyond the outboard hole 62 to ensure adequate support by the edge of the outboard hole 62.

A nut 74 is then threaded onto the bolt 72 to secure the bolt 72 to the hull 10. When the nut 74 is fully tightened, it comes to rest snugly between the retaining fins 66A–B, as shown in FIG. 8. The retaining fins 66A–B thus limit rotation of the nut 74 in response to torque transmitted by the strap 36. By doing so, the retaining fins 66A–B reduce the likelihood that the nut 74 will loosen during use.

Because of its strength, metal is typically used for making the nut 74 and bolt 72. However, other materials such as plastic can be used.

A shear force exerted on the strap 36 is transmitted to the hull 10 by the bolt 72. However, the hull 10 supports the bolt 72 at two different points, namely at the edge of the inboard hole 64 and also at the edge of the outboard hole 62. As a result, the strap-anchoring configuration shown in FIGS. 7–9 resists the tendency of the bolt 72 to pivot about a single support in response to a shear force. It does so by resisting shear force using shear resistance provided by the hull 10 at two different support points.

By concealing the nut 74 and bolt 72 from view, the rim portion 58 of the lip provides the hull 10 with a more attractive and streamlined appearance. This appearance can be enhanced by coloring the end of the bolt 72 or by extending the end of the bolt 72 slightly beyond the rim portion 58 so it can be capped.

In addition, by covering the nut 74 and bolt 72, the rim portion 58 also prevents the nut 74 and bolt 72 from snagging on nearby objects, such as the rider's clothing.

Referring back to FIG. 1, a pair of optional contoured shin pads 40 are used in combination with the knee strap 36 to maintain the axial position of the rider constant relative to the hull 10.

Figure 14:
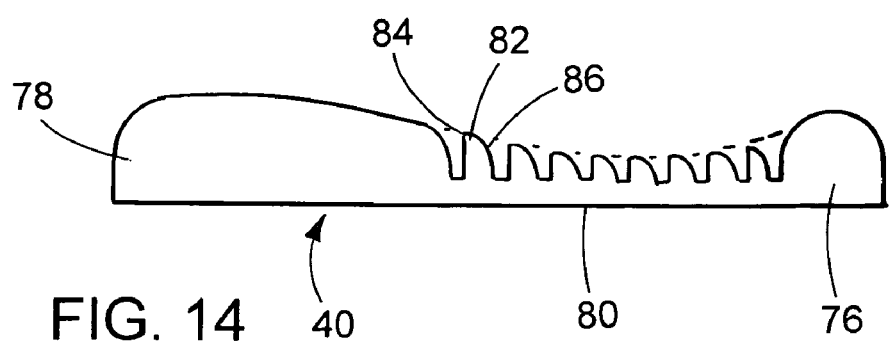
FIG. 14 is a shin pad with ribs of varying height.
Figure 15:
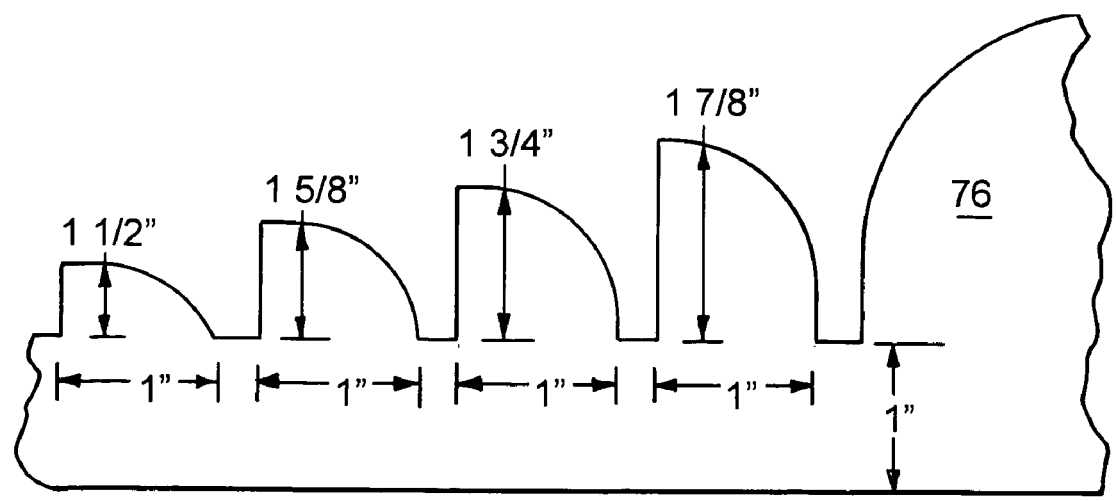
FIG. 15 is a detail view of the shin pad of FIG. 14.
Figure 16:
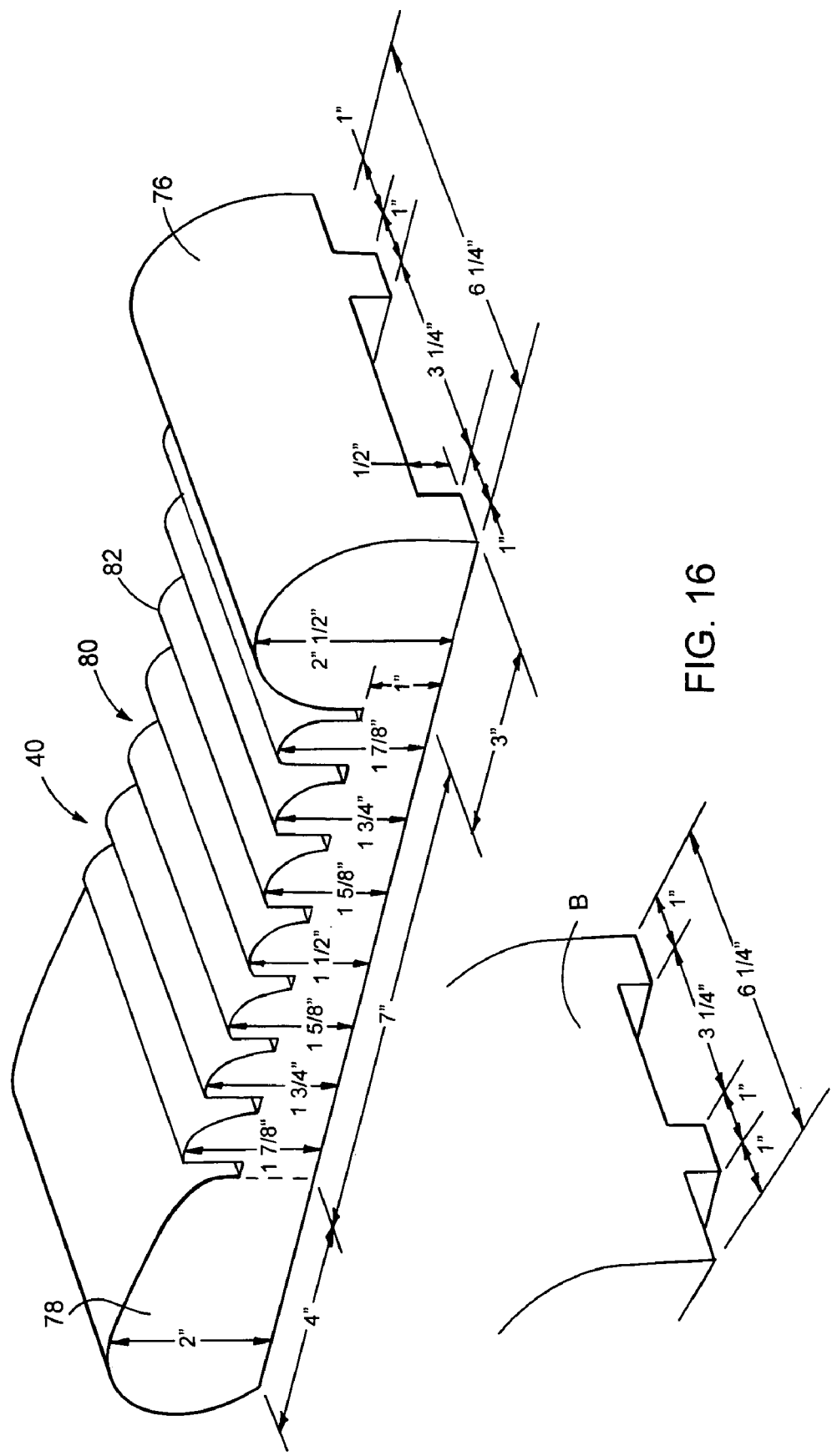
FIG. 16 is an isometric view of the shin pad.

A shin pad 40, a cross-section of which is shown in FIG. 14, is a unitary structure having a raised front portion that functions as a knee stop 76 and a raised back portion that functions as a foot stop 78. Between the foot stop 78 and the knee stop 76 is a ribbed portion 80 having transverse ribs 82 for gripping the rider's shin. A typical rib 82 has a vertical face that faces the rear of the hull 10 and a curved face that faces the front of the hull 10. In one embodiment, shown in FIG. 15, the heights of the ribs 82 vary to conform to the radius of curvature of the rider's shin. FIG. 16 shows an isometric view of the shin pad 40. The dimensions given in FIGS. 15–16 are selected to conform to typical adult dimensions (in inches).

The shin pad 40 slopes downward from the foot stop 78 to the front end of the ribbed portion 80. Past the front end of the ribbed portion 80, the shin pad 40 slopes upward to form the knee stop 76.

Figure 10:
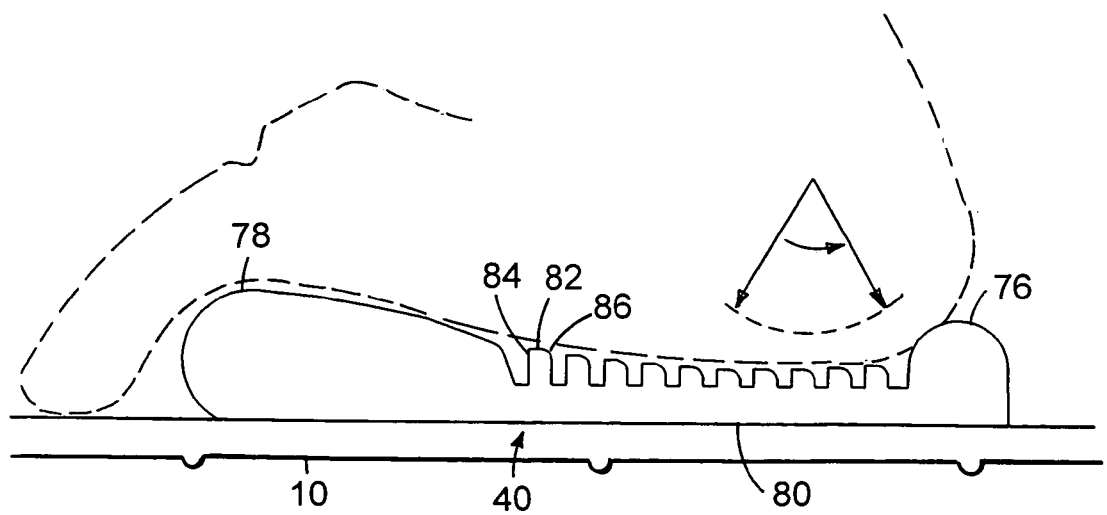
FIG. 10 is a side view of a shin pad attached to the hull.

When a rider kneels on the shin pad 40, as shown in FIG. 10, the rider's knee rests on the knee stop 76 and the front of the rider's foot rests on the foot stop 78. During sudden deceleration of the sled, deformation of the knee stop 76 and foot stop 78 absorb the rider's momentum and thereby restrain continued forward motion of the rider.

In response to the rider's weight, the ribs 82 deform. In their deformed state, the ribs 82 exert a force that tends to restore them to their undeformed state. This restoring force, when transmitted to the rider's shin, tends to grip the shin. Although the restoring force exerted by any one rib 82 is small, the collective restoring force exerted by all the ribs 82 is significant.

The gripping force exerted by the rib 82 is further enhanced by providing the rib 82 with a vertical leading face 84. In a rib 82 having a sloped leading face, the rider's shin has a tendency to slide forward over the rib 82. In contrast, the vertical leading face 84 of each rib 82 tends to resist this forward-sliding tendency of the shin.

The gripping force exerted by each rib 82 depends, in part, on the extent of its deformation. This, in turn, depends in part on the force exerted by the shin on the rib 82. This force has two components: one arising from the rider's own weight and another arising from any deceleration of the sled. Thus, one advantage of the shin pad 40 is that this gripping force increases momentarily when the sled rapidly decelerates or comes to a sudden stop.

Figure 11:
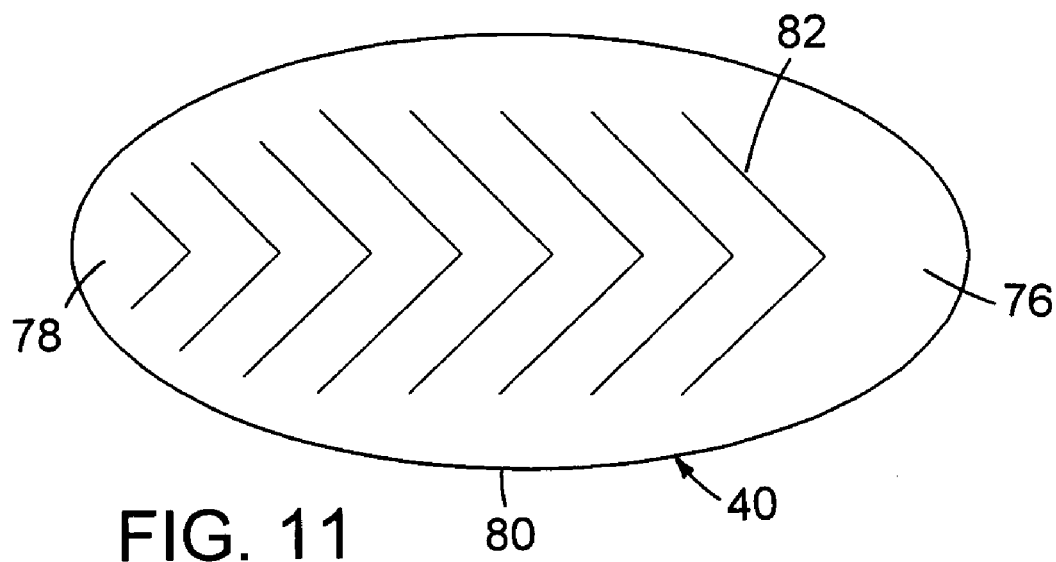
FIGS. 11–13 show different rib configurations and footprints for the shin pad of FIG. 8.
Figure 12:
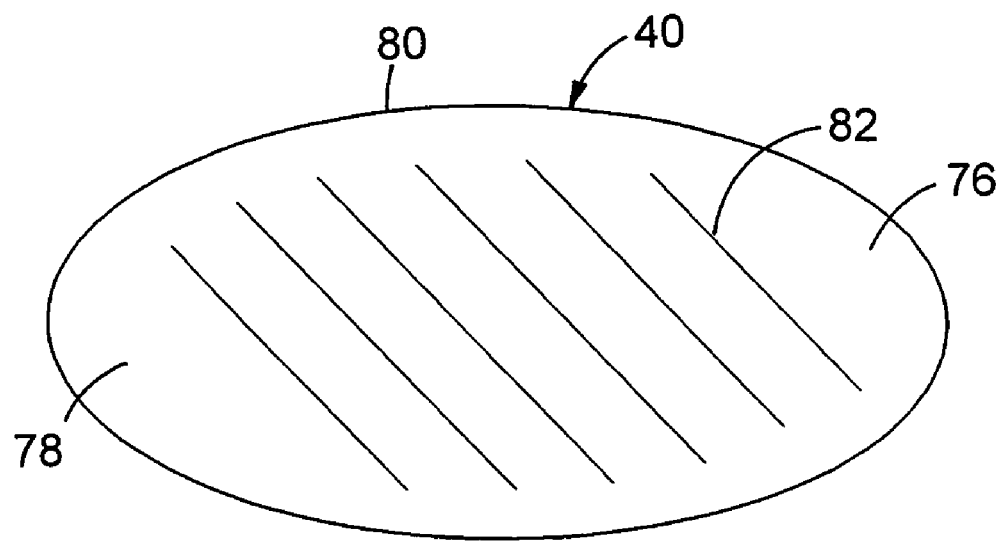
Figure 13:
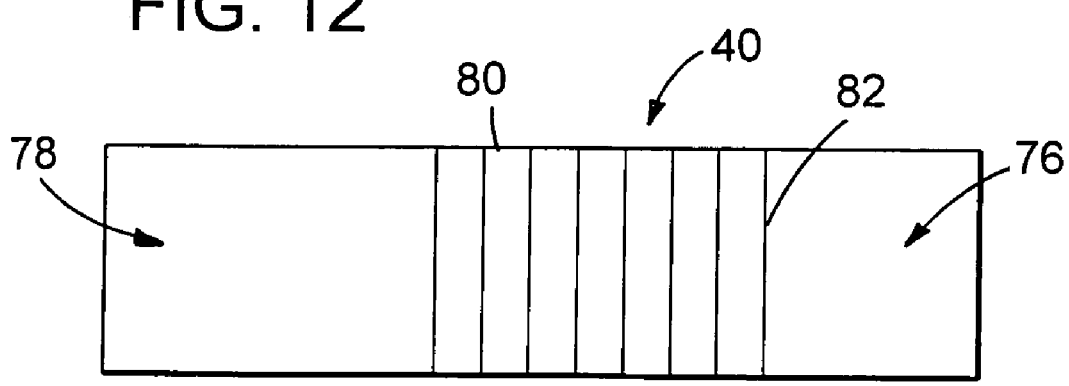

Other embodiments of the shin pad 40 include those having ribs 82 that extend in directions other than the transverse direction. For example, the shin pad 40 may include ribs 82 oriented in a herring-bone pattern, as shown in FIG. 11, or diagonally, as shown in FIG. 12. These configurations provide resistance to tangential forces that result when the sled changes turns. In addition, the shin pad 40 can have an oval footprint, as shown in FIGS. 11 and 12, or a rectangular footprint, as shown in FIG. 13.

The shin pad 40 is made of a resilient material such as a closed cell foam. However, it can also be made of a molded plastic. The material used to make the shin pad 40 should be one that enables the ribs 82 to deform in response to the rider's weight but to resist deformation enough to grip the rider's shin. In addition, the material should be sufficiently resilient to return to its original shape even after repeated and sustained deformation.

When manufactured out of closed cell foam, the ribs 82 of the shin pad 40 are cut out with a heated wire. However, other methods of cutting the ribs 82 of the shin pad 40, for example, with high-pressure water jets, can also be used. In other embodiments, the shin pad 40 can be molded out of a suitably resilient plastic.

The invention has been described in the context of a specific recreational racing sled. However, the various features of the invention can readily be incorporated other types of recreational sleds.

Having described the invention, and a preferred embodiment thereof, I now claim as being new and secured by Letters Patent:

1. A sled for sliding on a sliding surface, the sled comprising
   a hull having
      a bow end,
      a stern end having a curved portion, the bow end and the stern end defining a longitudinal axis extending therebetween;
      a bottom surface for contacting the sliding surface a gunwale portion having a portion that extends downward part-way to the bottom surface; and
      a snow-brake integral with the hull, the snow-brake being formed from said gunwale portion of the hull that extends outward from the gunwale and downward part-way to the bottom surface, the snow-brake forming a scoop and wraps around a the gunwale portion at the stern end such that the scoop engages the sliding surface when an angle between the hull and the sliding surface exceeds a critical angle and when the sled travels in a direction that differs from the longitudinal axis, the critical angle being selected such that the bottom surface contacts the sliding surface while the snow-brake engages the sliding surface.

2. The sled of claim 1, wherein the snow-brake is formed from the stem end of the hull.

3. The sled of claim 1, wherein the snow-brake is formed from the side portion of the hull.

4. The sled of claim 3, wherein the gripping element is selected from the group consisting of a tooth, a claw, and a stud.

5. The sled of claim 3, wherein the gripping element is integral with the snow-brake.

6. The sled of claim 3, wherein the gripping element is fastened to the snow-brake.

7. The sled of claim 1, further comprising a gripping element mounted on a rim of the snow-brake.

* * * * *